United States Patent
Hajek (10) Patent No.: US 7,210,585 B2
(45) Date of Patent: May 1, 2007

(54) EDGE FILTER ASSEMBLY

(75) Inventor: Thomas J Hajek, Lockport, IL (US)

(73) Assignee: Caterpillar Inc, Peoria, IL (US)

( * ) Notice: Subject to any disclaimer, the term of this patent is extended or adjusted under 35 U.S.C. 154(b) by 277 days.

(21) Appl. No.: 10/639,215

(22) Filed: Aug. 12, 2003

(65) Prior Publication Data

US 2004/0108264 A1    Jun. 10, 2004

Related U.S. Application Data

(60) Provisional application No. 60/431,884, filed on Dec. 9, 2002.

(51) Int. Cl.
    *B01D 29/46* (2006.01)
    *B01D 29/44* (2006.01)

(52) U.S. Cl. .............. 210/489; 210/232; 210/336; 210/446; 210/488; 210/498; 210/494.3; 96/392; 96/393

(58) Field of Classification Search ........... 210/232, 210/336, 446, 456, 488, 489, 492, 498, 494.2, 210/494.3; 96/392, 393
See application file for complete search history.

(56) References Cited

U.S. PATENT DOCUMENTS

| | | | | |
|---|---|---|---|---|
| 2,903,136 A | * | 9/1959 | Buckman | ............ 210/483 |
| 2,999,598 A | * | 9/1961 | Schade | ............ 210/488 |
| 3,633,751 A | | 1/1972 | Stevens | |
| 4,276,065 A | | 6/1981 | Miko et al. | |
| 4,410,430 A | | 10/1983 | Hagler, Jr. | |
| 4,601,824 A | * | 7/1986 | Dreyer | ............ 210/232 |
| 4,683,060 A | * | 7/1987 | Drori | ............ 210/448 |
| 4,732,677 A | * | 3/1988 | Thornton | ............ 210/347 |
| 4,966,702 A | * | 10/1990 | Drori | ............ 210/448 |
| 5,015,381 A | | 5/1991 | Ellion et al. | |
| 5,069,789 A | | 12/1991 | Mohn et al. | |
| 5,100,556 A | | 3/1992 | Nichols | |
| 5,560,825 A | | 10/1996 | Shafer | |
| 6,059,861 A | | 5/2000 | Davila et al. | |
| 6,461,506 B1 | | 10/2002 | Bradford | |
| 6,942,796 B2 | * | 9/2005 | Lacasse et al. | ............ 210/316 |

FOREIGN PATENT DOCUMENTS

| | | |
|---|---|---|
| EP | 0177434 B1 | 9/1986 |
| WO | WO 02/40132 A1 | 9/2001 |

* cited by examiner

*Primary Examiner*—John Kim
(74) *Attorney, Agent, or Firm*—Steven M. Hanley; D. James Barnes (57) ABSTRACT

An edge filter assembly is disclosed. The edge filter assembly may include a housing having an inlet and an outlet. The edge filter assembly may further include a filter element disposed within the housing including first and second filter plates and first and second spacers disposed between the first and second filter plates. The spacers and filter plates may be configured and arranged to form a flow channel extending generally radially within the housing and defined between the first and second filter plates and the first and second spacers. The flow channel may have an inner flow gate and an outer flow gate. The inner flow gate may be disposed radially inward of the outer flow gate and may have a different cross-sectional configuration than the outer flow gate. The first filter plate may have an axial projection extending therefrom generally aligned with a fluid path within the housing.

24 Claims, 4 Drawing Sheets

EDGE FILTER ASSEMBLY

This application claims the benefit of prior provisional patent application Ser. No. 60/431,884 filed Dec. 9, 2002, which is hereby incorporated herein in its entirety.

TECHNICAL FIELD

The invention relates to a filter and more particularly, but not exclusively, to an in-line filter for a hydraulic system.

BACKGROUND

Several methods of filtering fluids using an edge filter have been used in the past. In general, an edge filter may include a rod, having specially milled surfaces, which is fit within a bore. Debris or particles, entrained within a fluid, are deposited on the milled surfaces as fluid flow transitions from straight tube flow geometry to annular flow geometry, for example. This type of edge filter, although effective in trapping and removing particles entrained within the fluid, undesirably limits flow and is prone to premature clogging. Moreover, many fluid control systems are adapted for precise fluid control, and employing a filter which is prone to clogging and unduly limiting flow is highly undesirable.

Edge filter designs have also become significantly complicated in that multiple components are typically required and very few, if any, are identical. Moreover, the manufacturing and assembly process required to complete such a filter has become cumbersome or requiring of expensive tooling and, as a result, the manufacturing and assembly process has become increasingly expensive. Consequently, the expense, due to filter complexity and increased assembly time, causes the filter to be uneconomical and undesirable for manufacturers seeking to implement fluid filtration systems at a reasonable cost.

For example, U.S. Pat. No. 6,461,506 issued to Bradford discloses an edge filter assembly having a multi-faceted conical inner assembly. Additionally, this edge filter employs particle retention features which may cause significant flow limitation for the filter as debris begins to accumulate and block primary flow through the filter.

The subject invention is directed to overcoming one or more of the above mentioned disadvantages.

SUMMARY OF THE INVENTION

According to one aspect of the invention, an edge filter assembly may be provided. The edge filter assembly may include a housing having an inlet and an outlet. The edge filter assembly may further include a filter element disposed within the housing including first and second filter plates and first and second spacers disposed between the first and second filter plates. The first and second spacers may be formed from a continuous pattern of material extending between the first and second filter plates. The spacers and filter plates may be configured and arranged to form a flow channel extending generally radially within the housing and defined between the first and second filter plates and the first and second spacers. The flow channel may define at least one flow gate. For example, the flow channel may have an inner flow gate and an outer flow gate. The inner flow gate may be disposed radially inward of the outer flow gate and may have a different cross-sectional area than the outer flow gate. The first filter plate may have at least one axial projection extending therefrom generally into and generally aligned with a fluid path within the housing. The housing and the filter element may be configured and arranged to direct fluid from the inlet to a first flow gate, the first flow gate being sized to block passage therethrough of debris entrained in the fluid as the fluid passes from the inlet to the outlet of the housing.

According to another aspect of the invention, an edge filter assembly including a housing having an inlet and an outlet may be provided. The assembly may also include a filter element disposed within the housing including first and second filter plates and first and second spacers disposed between the first and second filter plates. The spacers and filter plates may be configured and arranged to form a first flow channel extending generally radially within the housing and defined between the first and second filter plates and the first and second spacers. A second filter element may be provided and may be disposed within the housing downstream of the first filter element. The second filter element may include first and second filter plates and first and second spacers disposed between the first and second filter plates of the second filter element. The spacers and filter plates of the second filter element may be configured and arranged to form a second flow channel extending generally radially within the housing and defined between the first and second filter plates of the second filter element and the first and second spacers of the second filter element. The housing and the filter elements may be configured and arranged to direct fluid first through the first flow channel in one of a radially inward direction and a radially outward direction and to change the flow direction of the fluid downstream of the first flow channel to direct fluid through the second flow channel in the other of the radially inward direction and the radially outward direction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

DETAILED DESCRIPTION

Reference will now be made in detail to embodiments of the invention, examples of which are illustrated in the accompanying drawings. Wherever possible, the same or corresponding reference numbers will be used throughout the drawings to refer to the same or corresponding parts.

Figure 1:
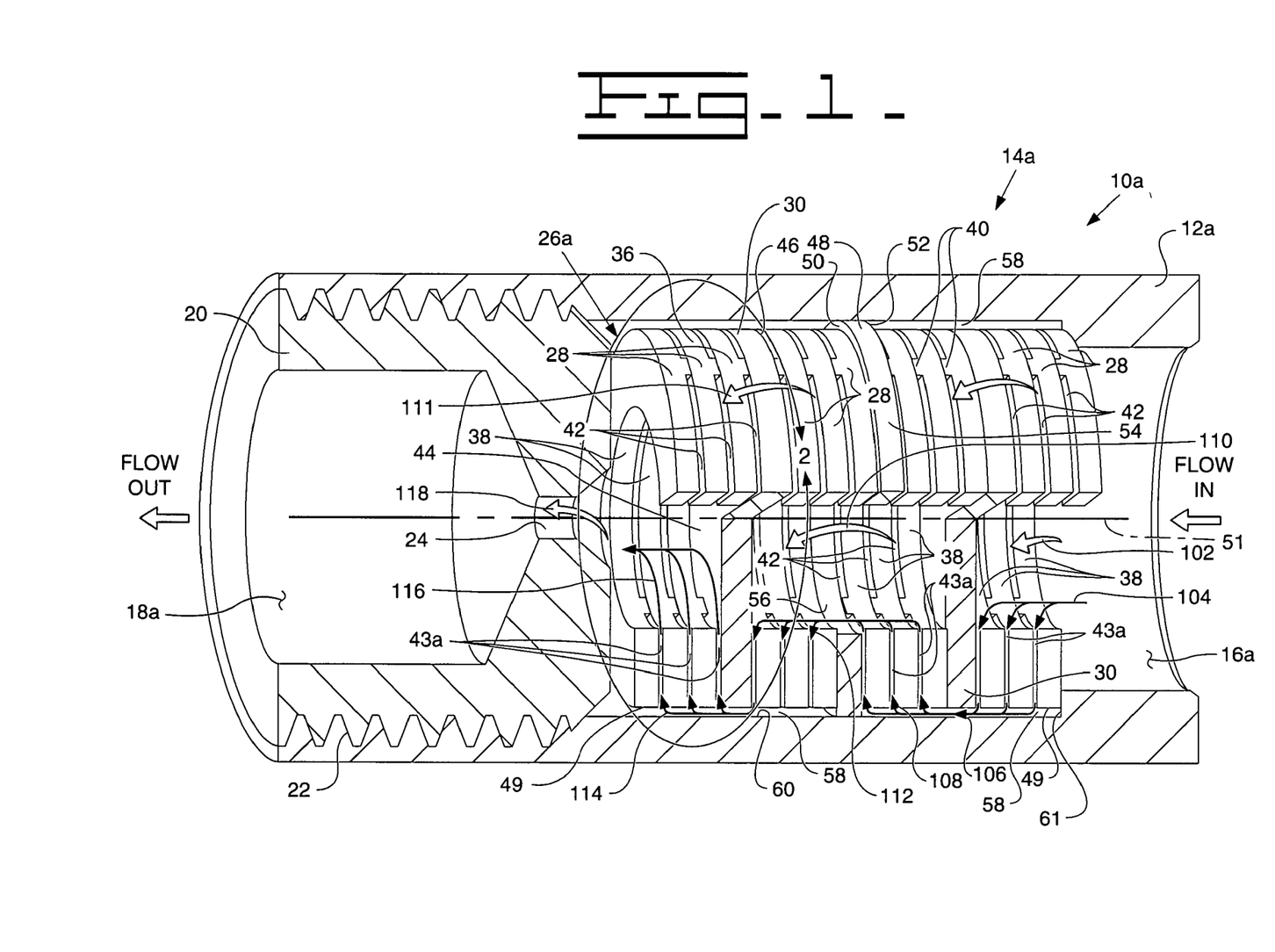
FIG. 1 is a sectional view of a first embodiment of an edge filter assembly according to the present invention, showing the filter subassembly partially in section.

Referring to FIG. 1, a first embodiment of an edge filter assembly is shown. Edge filter assembly 10a includes a housing 12a supporting a filter subassembly 14a, and having an inlet 16a and an outlet 18a. A plug 20, having a centrally located orifice 24, is positioned downstream relative to the filter subassembly 14a. In an exemplary embodiment the plug 20 is engaged with the housing 12a through a threaded engagement 22.

Figure 2:
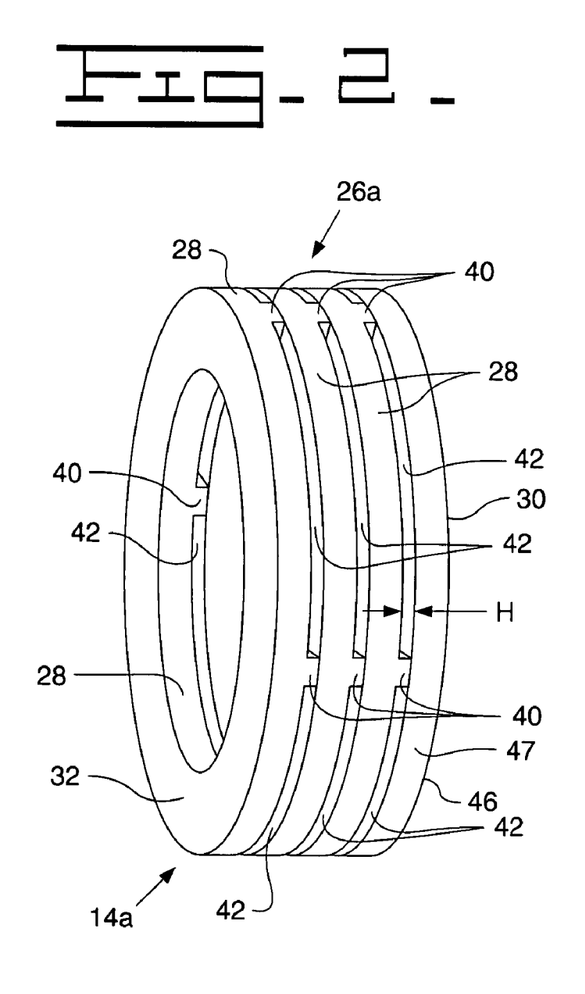
FIG. 2 is a view of the encircled portion of FIG. 1, showing a single filter element having multiple edge filter plates and an end plate.

The filter subassembly 14a may include one or more identical filter elements 26a (e.g., 4) to provide adequate filtration without undue flow restriction. Furthermore, since many of the components of the edge filter assembly 10a are identical, expenses due to manufacturing, assembly and storage may be significantly improved over prior known filter assemblies. As best shown in FIG. 2, each filter element 26a may include multiple filter plates 28, such as three filter plates, for example, and an end plate 30. However, it is envisioned that even a single filter plate 28 in each filter element 26a would provide suitable filtration for certain systems. In such an embodiment, a portion of the housing 12a may act as a filter plate.

Figure 3:
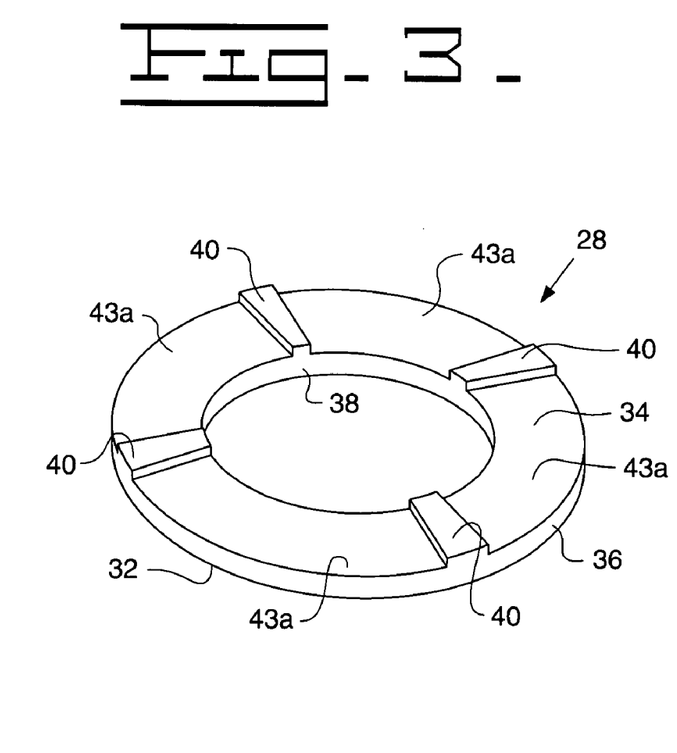
FIG. 3 is a perspective view of a single filter plate of the embodiment of FIG. 1.

Referring to FIG. 3, each filter plate 28 may include a first side 32, a second side 34, an outer edge 36 and an inner edge 38. Spacers 40 may outwardly extend from the second side 34 of the filter plate 28 and are spaced apart. It will be understood that stacking a pair of plates 28, whereby the second side of a first plate is interfaced with the first side of a second plate (as shown in FIG. 1) and so that spacers 40 are disposed between the first and second plates, may create four outer elongate slots or gates 42 of height "H", for example at the outer edges 36 of the filter plates 28, and four inner elongate slots or gates 42, for example at the inner edges 38 of the filter plates 28. The gates 42 open into four arcuate channels 43a which radially extend through the filter element 26a. It will be further understood that particulate debris, which is typically carried by the fluid, is blocked from passing through the gate, that is, if the size of the debris exceeds the height and/or width of the gate. Consequently, each gate 42 is sized to prevent passage of debris which may compromise system performance and cause premature wear and maintenance. A gate height of 0.08 mm on a 5 mm diameter plate, for example, may be used in association with an exemplary embodiment. Also, by employing multiple gates within the filter assembly 10a, undesirable flow restriction may be significantly reduced or avoided. Its should further be appreciated that the spacers 40 may be configured and arranged so that the outer and inner flow gates 42 (e.g., at the outer and inner edges 36, 38) have different cross-sectional configurations (e.g., cross-sectional areas or shapes). For example, the inner flow gate may have, for example, a smaller cross-sectional area and/or a smaller circumferential length than the outer flow gate. Thus, the cross-sections of the channels 43a may vary between the outer and inner flow gates 42 (e.g., between the outer and inner edges 36, 38). Moreover, such a configuration may allow different filtering results or characteristics based on the direction of fluid flow through the filter. Thus, filtering characteristics may be selectively controlled by changing the direction of fluid flow through the filter.

In an exemplary embodiment, for example as provided in FIG. 1., the spacers 40 may be disposed in radial alignment. However, it should be appreciated that the spacers 40 need not be aligned with each other. In fact, it may be beneficial that the spacers 40 not be radially aligned since flow would be urged to follow a path which is increasingly projected compared to the path provided if the spacers 40 (and channels 43a) were aligned. Additionally, a further benefit may include that care need not be taken during the assembly process to align the spacers 40, which may provide a cost effective reduction of assembly time.

The end plate 30 of the subassembly 14a may include a solid wall 44 to divert flow radially, outwardly, often referred to as "turning the flow", relative the axially moving inlet flow. The end plate 30 may includes a second side 46 and an outer perimeter surface 47.

Referring again to FIG. 1, an annular diverter plate 48 may be provided to divert filtered flow from the outer margins 49 of the filter subassembly 14a toward a centerline 51 of the filter subassembly 14a. In so doing, the fluid is forced in a serpentine path through the filter subassembly 14a to effectuate increased flow through the gates and concomitant filtering performance. Each diverter plate 48 includes a first side 50, a second side 52, an outer edge 54 and an inner edge 56 or throat. The outer edge 54 of the diverter plate 48 is engaged with an inner surface 60 of the housing 12a such that little if any fluid is allowed to pass the periphery of the diverter plate 48. It will be understood that an annular space 58, provided between the outer margins 49 of the filter subassembly 14a and the inner surface of the housing 12a, is positioned to direct flow to the next filter element, and additionally, retain debris accumulating at the gates 42.

The filter subassembly 14a may be retained under compressive loading, within the housing 12a, between the plug 20 and an end wall 61 of the housing. Specifically, a compressive load is applied to the stack of plates to resist plate and gate deformation during extreme flow conditions, for example. Alternatively, the filter subassembly 14a may be retained within the housing 12a using any other means known to those having ordinary skill in the fluid filtering arts.

Figure 4:
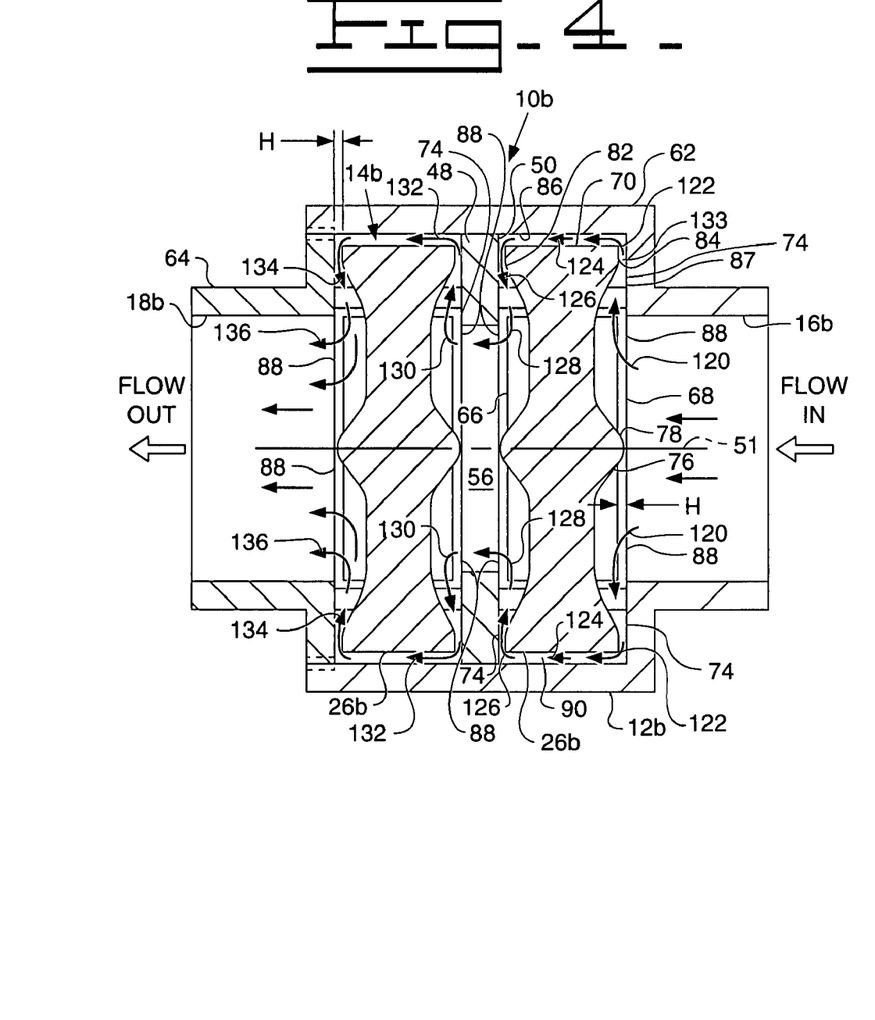
FIG. 4 is a sectional view of a second embodiment of an edge filter assembly according to the present invention.

Referring to FIG. 4, a second embodiment of an edge filter assembly is shown. The edge filter assembly 10b includes a flanged housing 12b provided with an inlet 16b and an outlet 18b. The housing 12b includes a first portion 62 which is sized to support a filter subassembly 14b therein. A second portion 64 of the housing 12b retains the subassembly 14b and may engage the first portion 62 by, for example, threaded engagement, interference fit, swage fit, welded joint or any other alternative engagement relationship known to those having ordinary skill in the art.

The filter subassembly 14b may have a pair of identical filter elements 26b. Alternatively, it is contemplated that a single filter element 26b may be provided in the housing to provide adequate fluid filtration for certain systems. In such an embodiment, a portion of the housing 12b may act as a filter plate.

Figure 5:
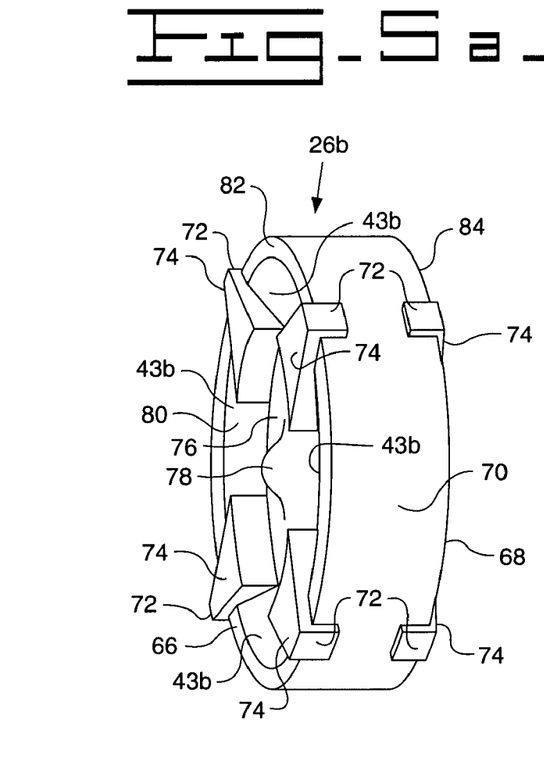
FIG. 5A is a perspective view of a first embodiment of a filter element of the second embodiment edge filter assembly of FIG. 4.
FIG. 5B is a perspective view of a second embodiment of a filter element of the second embodiment edge filter assembly of FIG. 4.
FIG. 5C is a perspective view of a third embodiment of a filter element of the second embodiment edge filter assembly of FIG. 4.
FIG. 5D is a perspective view of a fourth embodiment of a filter element of the second embodiment edge filter assembly of FIG. 4.

Referring to FIG. 5A, the filter element 26b will now be described. Each filter element 26b may be made of a single part, such as a single filter plate, including a first side 66, a second side 68 and an outer surface 70. The filter element 26b may be manufactured from a polymer, steel or aluminum alloy, for instance. The steel or aluminum alloys may be subjected respectively to a known powder metal or die-casting process, for example. Other materials and processes known by those having ordinary skill in the polymer and metal fabrication arts may be alternatively employed to produce the filter element 26b. Since the first and second sides 66, 68 are identical in the exemplary embodiment, the details of the second side 68 need not be fully discussed. The cylindrical outer surface 70 may include four spaced and radially raised projections 72 disposed thereon and extended therefrom. Additionally, four equally spaced spacers 74 may be disposed on and may axially extend from the first side 66 of the filter element 26b. Side 66 includes a recessed wall 76 having an axially projected portion or nib 78 projected along the centerline 51 (FIG. 4). The filter element 26b further includes a first rim 82 positioned between the outer surface 70 and the first side 66 and a second rim 84 positioned between the outer surface 70 and the second side 68. It may be seen that an annular and generally concave ring 80 connects the first rim 82 and the wall 76. The housing 12b includes a cylindrical inner surface 86, which is engaged by the radial projections 72 to allow centering of the filter element 26b within the housing 12b.

Referring again to FIG. 4, the edge filter assembly 10b includes the diverter plate 48, which may act as a filter plate, and which may be positioned between the filter elements 26b. Since the pair of filter elements 26b are of similar construct and are similarly engaged by the housing 12b and diverter plate 48, then the engagement details of just one of the filter elements will be described. The axial spacers 74 disposed on the first side 66 of the filter element 26b contact the first side 50 of the diverter plate 48. Similarly, the axial spacers 74 disposed on the second side 68 of the filter element 26b contact an end wall 87 of the housing 12b. Notably, a plurality of gates 88, such as four gates, for example, may be formed between the rim 82 and the diverter plate 48 relative to the first side 66 of the filter element 26b. Additionally, a plurality of gates 88 may be formed between the rim 84 and the end wall 87 of the housing 12b relative to the second side 68 of the filtering element 26a. As best seen in FIG. 5A, the gates 88 open into four arcuate channels 43b which radially extend through the annular wall of the filter element 26a. It should be appreciated that the each arcuate channel 43b may have an inner gate and an outer gate as described above with respect to the embodiment of FIG. 1. Moreover, the inner and outer gates may have different cross-sectional configurations (e.g., cross-sectional areas or shapes). An annular space 90 may be provided between the housing 12b and the outer surface 70 of the filter element 26b to catch debris as the fluid passes over the outer surface 70 of the filter element 26b.

Figure 5B:
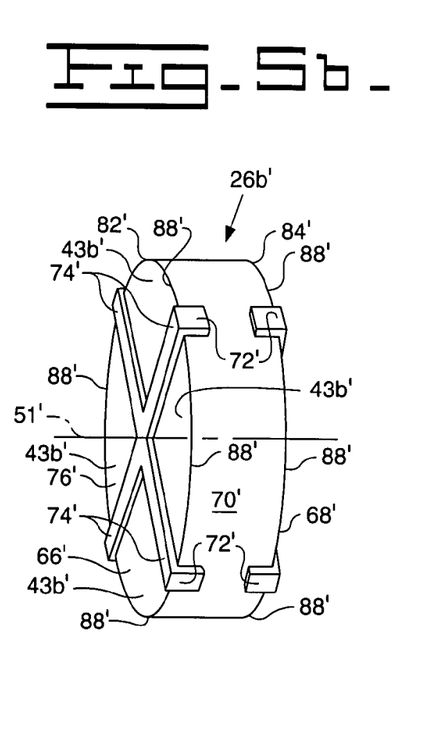
Figure 5C:
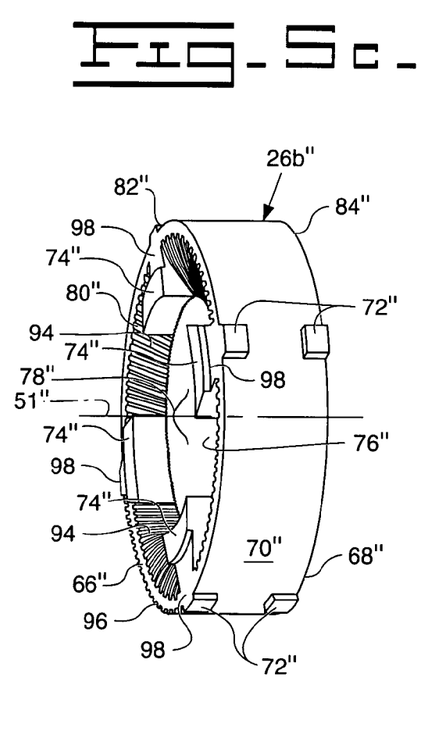
Figure 5D:
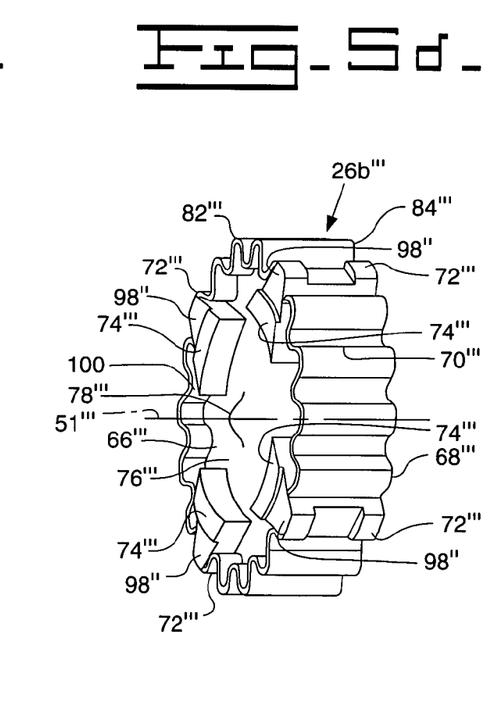

FIGS. 5B, 5C and 5D illustrate modified embodiments of filter element 26b wherein certain corresponding elements are denoted by primed reference numerals. Referring to FIG. 5B, the filter element 26b' will now be described. Filter element 26b' (e.g., a filter plate) includes a first side 66', a second side 68' and a cylindrical outer surface 70'. In the exemplary embodiment of FIG. 5B, the first and second sides 66', 68' are identical, thus the details of the second side 68' need not be fully discussed. The cylindrical outer surface 70' may include four equally spaced and radially raised projections 72' extended from the outer surface 70'. Additionally, four spacers 74' may be disposed on and may outwardly and axially extend from the first side 66' of the filter element 26b'. In contrast to the recessed wall 76 provided by the filter element 26b, shown in FIG. 5A, the filter element 26b' may include a substantially flat wall 76'. The raised axial spacers 74' disposed on the filter element 26b' (e.g., a filter plate) may extend outwardly from the wall 76', directed along the centerline 51', to form a pattern of outwardly extending material disposed on the filter element 26b', such as an X-shaped pattern of material which is generally continuous. It should be appreciated that the same pattern of material may also form the projections 72'. It should further be appreciated that it is also envisioned that material from the center portion of the X could be removed to increase exposed flow area. The filter element 26b' may further include a first rim 82' positioned between the outer surface 70' and the first side 66' and a second rim 84' positioned between the outer surface 70' and the second side 68'. It may be seen that four triangular recessed channels 43b' may be formed between the filter element 26b' and a diverter plate 48 (FIG. 4) (e.g., acting as a filter plate) or a portion of the housing 12b (e.g., acting as a filter plate). The channels 43b' may be positioned between outer and inner flow gates 88' as described above with respect to FIG. 1. By providing such a simple design for the filter element 26b', expenses associated with tooling and machining may be made to improve cost effectiveness. Similar to the filter element 26b of FIGS. 4 and 5A, the radial projections 72' provide centering relative to the inner surface 86 of the housing 12b (FIG. 4).

Referring to FIG. 5C, another embodiment of a filter element 26b" will now be described. Each filter element 26b" includes a first side 66", a second side 68" and a cylindrical outer surface 70". Since the first and second sides 66", 68" are identical in the exemplary embodiment, the details of the second side 68" need not be fully discussed. The cylindrical outer surface 70" may have four spaced and radially raised projections 72" disposed thereon and extended therefrom. Additionally, four equally spaced spacers 74" may be disposed on and may axially extend from the first side 66" of the filter element 26b". Notably, each spacer 74" is offset relative to a first rim 82" by a gap 98 to provide a continuous gate 88" (not shown) which may extend a full 360 degrees about the centerline 51". The first side 66" includes a recessed wall 76" having an axially projected portion or nib 78" projected along the centerline 51". The filter element 26b" further includes the first rim 82" positioned between the outer surface 70" and the first side 66" and a second rim 84" positioned between the outer surface 70" and the second side 68". It may be seen that an annular and generally concave ring 80" connects the first rim 82" and the wall 76". The ring 80" may include a plurality of radially extended grooves 94 to aid in directing flow toward the outer surface 70" during operation. Again, as is described in previous embodiments, the radial projections 72" may engage with the inner surface 86 of the housing 12b to allow centering of the filter element 26b" within the housing 12b (FIG. 4). At least one portion 96 of the outer surface 70" may be corrugated to enhance the capture of debris as particle laden fluid flow progresses along the rims 82" and 84" during operation. Alternatively, substantially all of the outer surface 70" may be corrugated to enhance debris retention at the outer margins of the filter element 26b".

Referring to FIG. 5D, another embodiment of a filter element 26b'" will now be described. Each filter element 26b'" includes a first side 66'", a second side 68'" and a corrugated outer surface 70'". Since the first and second sides 66'", 68'" are identical in the exemplary embodiment, the details of the second side 68'" need not be fully discussed. The corrugated outer surface 70''' may have four spaced and radially raised projections 72''' disposed thereon and extended therefrom. Additionally, four equally spaced spacers 74''' outwardly and axially may be disposed on and may extend from the first side 66''' of the filter element 26b'''. Notably, each spacer 74''' is offset relative to a first rim 82''' by a gap 98''' to provide a continuous gate 88''' (not shown) which may extend a full 360 degrees about the centerline 51'''. The first side 66''' includes a recessed wall 76''' having an axially projected portion or nib 78''' projected along the centerline 51'''. The filter element 26b''' further includes the first rim 82''' positioned between the outer surface 70''' and the first side 66''' and a second rim 84''' positioned between the outer surface 70''' and the second side 68'''. It may be seen that a corrugated inner surface 100 is radially offset relative the corrugated outer surface 70''' and extends in a direction along the centerline 51''' and intersects the recessed wall 76'''. Both the outer and inner surfaces 70''' and 100 include corrugations made of alternating concave-convex semi-circular portions. The radial projections 72''' engage with the inner surface 86 of the housing 12b to allow centering of the filter element 26b'' within the housing 12b (FIG. 4). The corrugated outer and inner surfaces 70''' and 100, respectively provide enhanced particle retaining capabilities so that a significant portion of debris may be captured by the corrugations during operation.

INDUSTRIAL APPLICABILITY

Referring to FIG. 1, operation of the first embodiment edge filter assembly 10a will now be discussed. Pressurized fluid, introduced into the inlet 16a of the housing 12a, flows along the centerline 51 and into the gates 42, as illustrated by flow arrow 102. Specifically, fluid initially follows an axial path along the centerline 51 until such fluid confronts the end plate 30. The flow deflects off of the end plate 30 and is then redirected in a radial direction towards the gates 42 along the inner surfaces 38 of the filter plates 28. Notably, debris collects at the gates 42 proximate to the inner surfaces 38 as fluid is allowed to pass through the gates and through the channels 43a, as illustrated by arrows 104. Flow then progresses along a radial path through the gates 42 and then exits the outer margins 49 of the first filter element 26a. The fluid then flows in an axial direction through the annular space 58 illustrated by arrow 106. Flow confronts the second side 52 of the diverter plate 48 and is radially redirected through the gates 42 at the outer edge 36 of the filter plates 28, illustrated by arrow 108. Debris, carried by the fluid, is prevented from further transport by the gates 42 if such debris dimensionally exceeds the gate height and/or width. The debris which is blocked by the gates 42 accumulates in the annular area 58, being stored between the outer margins 49 of the filter subassembly 14a and the inner surface 60 of the housing 12a. The filtered fluid continues radially inward through the channels 43a of the plates and proceeds to exit the channels 43a as best illustrated by arrow 110. Since the diverter plate 48 is open at its center, flow moves in an axial direction along the inner surfaces 38 of the next two filter elements 26a. Flow then confronts the second side 46 of the end plate 30 and is redirected toward the remaining filter element 26a (illustrated by arrow 111) after having passed sequentially through the annular space 58 and the gates 42 respectively illustrated by arrows 112 and 114. Accordingly, debris accumulates in the annular space 58 within proximity of the plug 20. Thereafter, the filtered flow exits the channels 43a, illustrated by arrows 116, and then exits the housing 12a, illustrated by arrow 118 after having passed through the orifice 24.

Notably, the process of repeatedly turning the flow between axial and radial directions in combination with directing the fluid through strategically placed gates creates a serpentine flow path that is subject to a significant reduction of debris as the flow is urged to follow a tortuous path. By circulating flow in this manner, debris entrained in the flow is predominately isolated along the inner surfaces 38 of the plates 28 and the outer margins 49 of the filter subassembly 14a. Hence, debris is influenced to accumulate in the annular space 58 and within a hollow core of the filter subassembly 14a near the inner surfaces 38 of the filter plates 28. As a result, clean fluid is allowed to continue through the filter assembly 10a while the debris remains trapped at the inner surfaces 38 of the filter plates 28 and at the outer margins 49 of the filter subassembly 14a.

Further, it is envisioned that the filter assembly 10a is capable of being adapted to filter fluid in the opposite direction as well (i.e., causing fluid to flow to enter at 18a and to exit the filter assembly 10a at 16a of the filter housing 12a). Due to both the inner and outer edges, which may form inner and outer gates 42, being employed in any series filtering operation (FIG. 1) debris may be effectively filtered even when the flow is reversed. Moreover, the gates 42 of successive plates 28 may be equally sized to provide redundant filtration or, alternatively, may be sized progressively smaller to filter finer particles.

Referring to FIGS. 4 and 5A–5D, operation of the second embodiment edge filter assembly 10b will now be discussed. As best seen in FIG. 4, pressurized fluid, introduced into the inlet 16b of the housing 12b, flows along the centerline 51 and into inner gates 88, as illustrated by flow arrows 120. Specifically, fluid initially follows an axial path along the centerline 51 until such fluid confronts the end wall 76. The flow deflects off of the end wall 76 and is then redirected in a radial direction through the channels 43b after having passed through inner gates 88, as illustrated by arrows 122. Notably, the nib 78 acts to gently direct the flow into the gates 88 so that flow agitation is reduced and, as a result, filtering and flow performance may be enhanced. The nib 78 also inhibits long slender pieces of debris from turning and aligning with the inner gates to pass through the filter.

In addition to the nib acting to prevent elongate pieces of debris from passing through the gates, it will be understood that urging the fluid path between radial and axial orientations also acts to prevent elongate debris from passing through the edge filter. The elongate filament-type debris that tends to "line up" with a gate or channel and pass therethrough, however, is prevented from successive progressions since the next proceeding gate/channel is not radially aligned with the previous one. As previously mentioned, curved surfaces, such as the nib for example, also inhibit elongate debris from lining up with the gate and passing therethrough.

Flow then progresses along a radial path through the gates 88 and then exits the channels 43b through outer gates (e.g., at the outer surface 70 of the first filter element 26b). The fluid then flows in an axial direction through the annular space 90, illustrated by arrow 124. Flow confronts the first side 50 of the diverter plate 48 and is radially redirected through outer gates 88, illustrated by arrows 126. Debris, carried by the fluid, is prevented from further transport by the gates 88 if such debris dimensionally exceeds the gate height and/or width. The debris, which is blocked by the gates 88, accumulates in the annular area 90, being stored between the outer surface 70 of the filter subassembly 14b and the inner surface 86 of the housing 12b. The filtered fluid continues radially inward through the channels 43b (FIG. 5A) of the plates and proceeds to exit the channels 43b, illustrated by arrow 128. Since the diverter plate 48 is open at its center, flow moves in an axial direction along the inner surface 56 of the diverter plate 48. Flow then confronts the second side 68 of the next filter element 26*b* and is redirected toward the outer surface 70 thereof after having passed sequentially through the gates 88 and the annular space 90 respectively illustrated by arrows 130 and 132. Accordingly, debris accumulates about a peripheral area 133 on a face of the first filter element 26*b*, near the gates 88, and the annular space 90 at a position radially outside the outer surfaces 70 of the pair of filtering elements 26*b*. Thereafter, the filtered flow exits the channels 43*b*, illustrated by arrows 134, and then exits the housing 12*b*, illustrated by arrows 136 after having passed through the outlet 18*b*. Notably, the mode in which operation for the filter element embodiments shown in FIGS. 5B, 5C and 5D is substantially similar to that which was shown and previously described corresponding to FIGS. 4 and 5A.

It will be apparent to those skilled in the art that various modifications, variations and combinations can be made in the disclosed edge filter assemblies without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. An edge filter assembly comprising:
a housing having an inlet, an outlet, and a longitudinal axis;
a filter element disposed within the housing including first and second filter plates and first and second spacers disposed between the first and second filter plates, the spacers and filter plates being configured and arranged to define a flow channel extending generally radially within the housing and defined between the first and second filter plates and the first and second spacers, the flow channel defining a flow gate, and the first filter plate having at least one axial projection extending therefrom generally into and generally aligned with a fluid path within the housing, the axial projection being located on the housing axis;
wherein the housing and the filter element are configured and arranged to direct fluid from the inlet to the flow gate, the flow gate being sized to block passage therethrough of debris entrained in the fluid as the fluid passes from the inlet to the outlet, and
the axial projection is disposed between the first and second filter plates and in non-contact arrangement with the second filter plate.

2. The edge filter assembly of claim 1, wherein the axial projection is configured and arranged to urge fluid flow within the housing between radial and axial orientations.

3. The edge filter assembly of claim 1, wherein the axial projection includes a generally curved surface, the generally curved surface being configured and arranged to urge fluid flow within the housing between radial and axial orientations.

4. The edge filter assembly of claim 1, wherein the axial projection projects axially generally against the direction of fluid flow through the housing and is configured and arranged to urge fluid flow within the housing from a generally axial orientation to a generally radial orientation and toward the flow gate.

5. The edge filter assembly of claim 1, wherein:
the first filter plate has first and second sides, the axial projection being disposed on the first side of the first filter plate; and
the first filter plate further includes a second axial projection disposed on the second side of the first filter plate and extending axially therefrom generally into and generally aligned with a fluid path within the housing.

6. The edge filter assembly of claim 5, wherein the first and second axial projections are each configured and arranged to urge fluid flow within the housing between radial and axial orientations.

7. The edge filter assembly of claim 1, wherein:
the first filter plate has first and second sides;
the first side includes an outer circumferential edge; and
the first side includes a generally annular concave portion extending radially between the edge of the first side and the axial projection.

8. The edge filter assembly of claim 7, wherein the generally circumferential concave portion includes one or more radially extending grooves therein.

9. The edge filter assembly of claim 1, wherein:
the first filter plate includes first and second sides and an outer circumferential portion extending therebetween; and
at least a portion of the outer circumferential portion is corrugated.

10. The edge filter assembly of claim 1, wherein:
the first filter plate includes first and second sides and an outer circumferential portion extending therebetween; and
the edge filter assembly further comprises a plurality of spacers projecting radially of the outer circumferential portion and being configured and arranged to maintain a space between the outer circumferential portion of the first filter plate and the housing.

11. An edge filter assembly comprising:
a housing having an inlet, an outlet, and a longitudinal axis;
a first filter plate disposed within the housing;
a second filter plate disposed within the housing downstream of the first filter plate, the first filter plate having at least one axial projection extending therefrom generally into and generally aligned with a fluid path within the housing, the axial projection being disposed between the first and second filter plates and in non-contact arrangement with the second filter plate;
a plate for redirecting flow disposed between the first and second filter plates;
a first pair of spacers disposed between the first filter plate and the plate for redirecting flow, a first flow channel being defined between the first filter plate, the plate for redirecting flow, and the first pair of spacers, the first flow channel having an inner flow gate and an outer flow gate, the inner flow gate having a different cross-sectional configuration than the outer flow gate;
a second pair of spacers disposed between the plate for redirecting flow and the second filter plate, a second flow channel being defined between the plate for redirecting flow, the second filter plate, and the second pair of spacers, the second flow channel having an inner flow gate and an outer flow gate, the inner flow gate having a different cross-sectional configuration than the outer flow gate;
wherein the housing, the plate for redirecting flow, and the filter plates are configured and arranged to direct fluid from the inlet to the gates in the first flow channel and to the gates in the second flow channel, one of the gates of each of the flow channels being sized to block passage therethrough of debris entrained in the fluid as the fluid passes from the inlet to the outlet of the housing.

12. The edge filter assembly of claim 11, wherein the plate for redirecting flow is an end plate including a solid wall for diverting fluid into at least one of the first flow channel and the second flow channel or a diverter plate having a throat therein for the passage of fluid therethrough and having an outer edge engaged with an inner surface of the housing.

13. The edge filter assembly of claim 11, wherein the first filter plate is disposed in a first filter element disposed within the housing and the second filter plate is disposed in a second filter element disposed within the housing downstream of the first filter element.

14. The edge filter assembly of claim 11, wherein the axial projection is configured and arranged to urge fluid flow within the housing between radial and axial orientations.

15. The edge filter assembly of claim 14, wherein the axial projection includes a generally curved surface, the generally curved surface being configured and arranged to urge fluid flow within the housing between the radial and axial orientations.

16. The edge filter assembly of claim 11, wherein:
the first pair of spacers are formed from a continuous pattern of material extending between the first filter plate and the plate for redirecting flow; and
the second pair of spacers are formed from a continuous pattern of material extending between the second filter plate and the plate for redirecting flow.

17. The edge filter assembly of claim 16, wherein:
each of the first and second filter plates includes first and second sides and an outer circumferential portion extending therebetween; and
the continuous pattern of material forms a plurality of spacers projecting radially of the outer circumferential portion and being configured and arranged to maintain a space between the outer circumferential portion of the respective filter plates and the housing.

18. An edge filter assembly comprising:
a housing having an inlet and an outlet;
a first filter plate disposed within the housing;
a second filter plate disposed within the housing downstream of the first filter plate;
a first plate for redirecting flow disposed between the first and second filter plates, the first plate for redirecting flow including a wall;
first and second spacers disposed between the first filter plate and the first plate for redirecting flow, a first flow channel being defined between the first filter plate, the first plate for redirecting flow, and the first and second spacers;
third and fourth spacers disposed between the first plate for redirecting flow and the second filter plate, a second flow channel being defined between the first plate for redirecting flow, the second filter plate, and the third and fourth spacers;
the housing, the first and second filter plates, and the first plate for redirecting flow are configured and arranged to direct fluid first through the first flow channel in one of a radially inward direction and a radially outward direction and to change the flow direction of the fluid downstream of the first flow channel to direct fluid through the second flow channel in the other of the radially inward direction and the radially outward direction; and
a second plate for redirecting flow disposed within the housing, the second plate for redirecting flow having a throat therein for the passage of fluid therethrough and having an outer edge engaged with an inner surface of the housing, the second plate for redirecting flow being configured to assist in changing the flow direction of the fluid from one of a radially inward direction and a radially outward direction to the other of the radially inward direction and the radially outward direction.

19. The edge filter assembly of claim 18, wherein:
the first flow channel has an inner flow gate and an outer flow gate, the inner flow gate having a different cross-sectional configuration than the outer flow gate;
the second flow channel has an inner flow gate and an outer flow gate, the inner flow gate having a different cross-sectional configuration than the outer flow gate;
wherein the housing, the filter plates, and the first plate for redirecting flow are configured and arranged to direct fluid from the inlet to a first one of the gates in each of the flow channels, the first gate being sized to block passage therethrough of debris entrained in the fluid as the fluid passes from the inlet to the outlet of the housing.

20. The edge filter assembly of claim 11, wherein the axial projection is located on the housing axis.

21. The edge filter assembly of claim 12, wherein the plate for redirecting flow is the end plate, and the wall is configured to divert fluid between an outer edge of the end plate and the inner surface of the housing.

22. The edge filter assembly of claim 18, wherein the wall is configured to divert fluid between an outer edge of the first plate for redirecting flow and the inner surface of the housing.

23. An edge filter assembly comprising:
a housing having an inlet, an outlet, and a longitudinal axis;
a filter element disposed within the housing including first and second filter plates and first and second spacers disposed between the first and second filter plates, the spacers and filter plates being configured and arranged to define a flow channel extending generally radially within the housing and defined between the first and second filter plates and the first and second spacers, the flow channel defining a flow gate, and the first filter plate having at least one axial projection extending therefrom generally into and generally aligned with a fluid path within the housing, the axial projection being located on the housing axis;
wherein the housing and the filter element are configured and arranged to direct fluid from the inlet to the flow gate, the flow gate being sized to block passage therethrough of debris entrained in the fluid as the fluid passes from the inlet to the outlet,
the first filter plate has first and second sides, the axial projection being disposed on the first side of the first filter plate, and
the first filter plate further includes a second axial projection disposed on the second side of the first filter plate and extending axially therefrom generally into and generally aligned with a fluid path within the housing.

24. The edge filter assembly of claim 23, wherein the first and second axial projections are each configured and arranged to urge fluid flow within the housing between radial and axial orientations.

* * * * *